US010929205B2

United States Patent
Cleave et al.

(10) Patent No.: US 10,929,205 B2
(45) Date of Patent: Feb. 23, 2021

(54) TRIGGERED AUTOMATED OPERATIONS FOR SPACEBORNE AND AIRBORNE NODES

(71) Applicant: Lockheed Martin Corporation, Bethesda, MD (US)

(72) Inventors: Robert Randall Cleave, Half Moon Bay, CA (US); Shaun B. Coleman, San Jose, CA (US); John Edward Metzger, Campbell, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 16/173,109

(22) Filed: Oct. 29, 2018

(65) Prior Publication Data

US 2020/0133746 A1 Apr. 30, 2020

(51) Int. Cl.
*G06F 9/54* (2006.01)
*H04L 29/08* (2006.01)
*H04L 12/26* (2006.01)
*H04B 7/185* (2006.01)

(52) U.S. Cl.
CPC .......... *G06F 9/542* (2013.01); *H04B 7/18508* (2013.01); *H04L 43/08* (2013.01); *H04L 67/12* (2013.01)

(58) Field of Classification Search
None
See application file for complete search history.

(56) References Cited

U.S. PATENT DOCUMENTS

| | | | |
|---|---|---|---|
| 2004/0128670 A1* | 7/2004 | Robinson | G06F 9/465 718/1 |
| 2008/0258880 A1* | 10/2008 | Smith | G08B 21/10 340/286.02 |
| 2015/0318916 A1 | 11/2015 | Gopal et al. | |

* cited by examiner

*Primary Examiner* — Craig C Dorais

(57) ABSTRACT

Systems, methods, and software described herein provide enhancements for the deployment and management of converged resources across satellites, aircraft, and ground-based nodes to perform user tasks and applications. In one implementation, a system includes a first physical node that monitors sensor data to determine when the sensor data qualifies for an operation triggering event. Once the sensor data qualifies for the operation triggering event, the first physical node may generate and communicate a notification to a second physical node to initiate a new operation to support the triggering event.

20 Claims, 7 Drawing Sheets

TRIGGERED AUTOMATED OPERATIONS FOR SPACEBORNE AND AIRBORNE NODES

BACKGROUND

Satellites and aircraft can be deployed to provide various task-based operations, such as military and civilian observation operations, communications operations, navigation operations, weather operations, and research operations. Satellites and aircraft can include various sensors and communication equipment that are used to perform these desired tasks. For example, a weather satellite may include one or more cameras or imaging sensors that can be used to take images of Earth, and communication equipment that can be used to communicate the images to a control system on Earth. An aircraft drone might include cameras for imaging portions of the Earth and relaying those images to a control station. Although satellites and aircraft can both be configured to perform specialized operations, this equipment is typically specialized to perform only the particular tasks or must be controlled by an active human operator to perform the tasks. Moreover, satellites can be difficult to change which specialized tasks are performed after deployment into orbit.

Overview

The technology described herein improves the deployment and management of satellites, aircraft, and ground-based nodes to perform automated user tasks and applications. In one implementation, a first node in a system may monitor sensor data from sensors associated with the first node and identify an operation triggering event based on the sensor data. The first node may further identify a secondary node of the system that is associated with the triggering event and communicate a notification to the second node to initiate an operation associated with the operation triggering event.

This Overview is provided to introduce a selection of concepts in a simplified form that are further described below in the Technical Disclosure. The Overview is not intended to identify key features or essential features of the claimed subject matter, nor should it be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Figure 1:
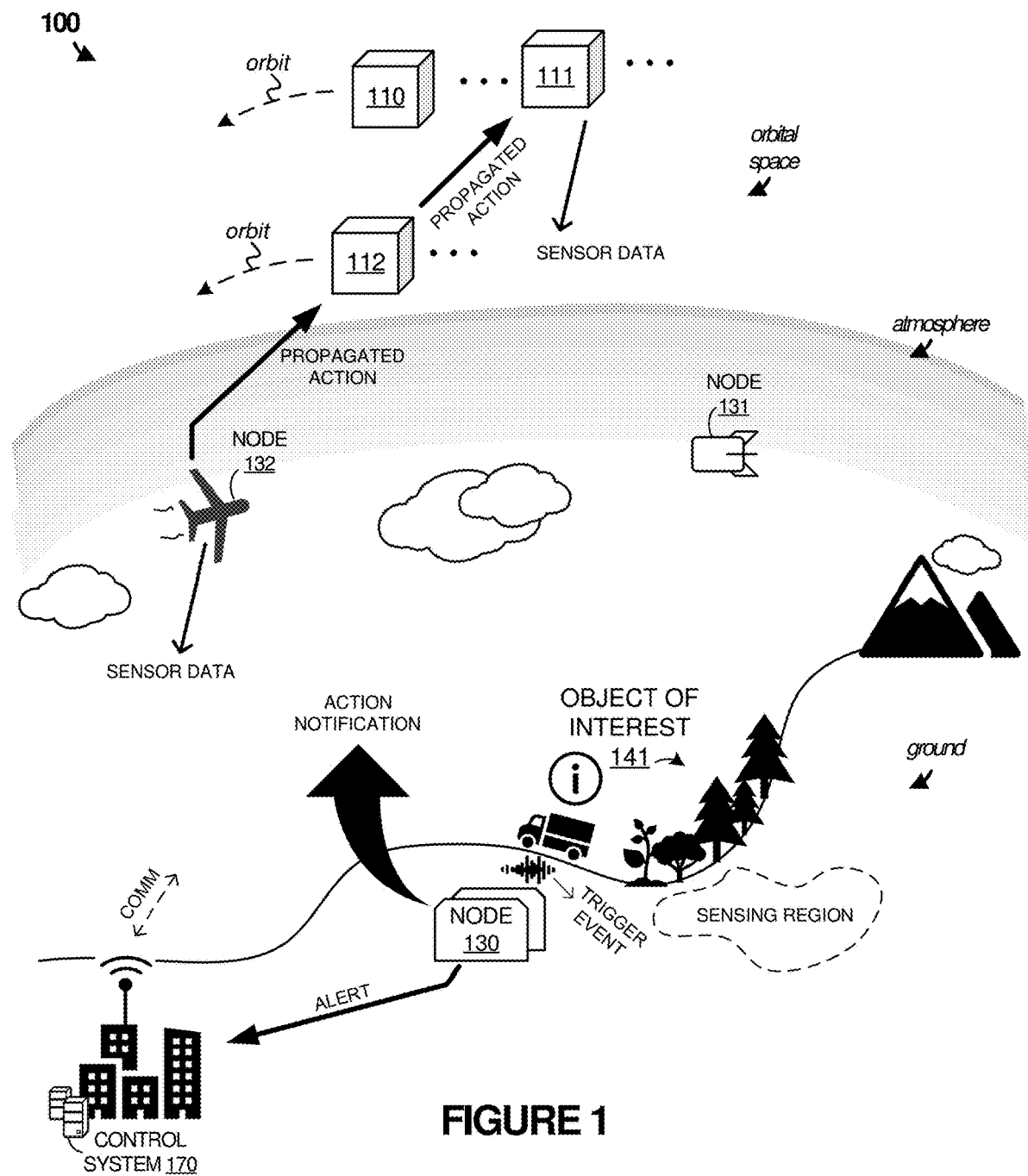
FIG. 1 illustrates a system to manage operation triggering events for airborne and spaceborne physical nodes according to an implementation.

FIG. 1 illustrates a system 100 to manage operation triggering events for mobile nodes, such as spaceborne or airborne physical nodes according to an implementation. System 100 includes physical nodes (nodes) 110-112 and 130-132, and control system 170. Physical nodes 110-112 are representative of spaceborne nodes that may comprise satellites, shuttles, capsules, or other similar spaceborne entities. Physical nodes 131-132 are representative of atmospheric nodes, such as aircraft, airplanes, drones, balloons, or some other similar airborne objects capable of data processing and/or gathering sensor observation data. Physical nodes 131-132 may be mobile or tethered. For example, a balloon device might be mobile, tethered, or both. Physical node 130 is representative of a surface-based data observation node. In some examples, physical node 130 may be mobile and comprise a car, truck, ship, vessel, vehicle, train, or other surface or subsurface-going vessel. In other examples, physical node 130 may be stationary and comprise a building, antenna array, tower, or other structure. Any number of satellite nodes, atmospheric nodes, and surface nodes may be employed.

In operation, physical nodes 110-112, and 130-132 are deployed to provide various operations for different tenants of system 100. These operations may include military, commercial, government, and civilian observation or monitoring operations, communications operations, navigation operations, weather operations, and research operations. In implementing the operations for the various tenants, control system 170 may provide an interface to the tenants, permitting the tenants to define target requirements and applications for the required operations. In some implementations, the target requirements may comprise processing resource requirements (type of processor, quantity of cores, and the like), storage requirements (quantity of storage, type of storage, and the like), communication requirements (bandwidth, throughput, target frequencies, and the like), sensor requirements (sensor type, sensor quality, and the like), geographic location requirements (defined objects and/or geographic regions of interest), or some other similar requirement. From the target requirements, an application may be developed that uses the target requirements to provide the desired functionality. As an example, a tenant may generate an application that requires at least a minimum quality or types of imaging sensors, at least a minimum quantity of processing resources, and at least a minimum amount of storage. An example application may be used to monitor vehicular traffic within a defined geographic region, where the application may use the imaging data to identify particular traits in the traffic and report the information to control system 170.

In some implementations, in employing an application, an application may use multiple nodes within the platform to provide the desired operation. As an example, a first node or monitoring node in system 100 may include a process to monitor sensor data from various sensors to determine when the sensor data causes an operation triggering event. This operation triggering event may occur when the sensor data meets particular criteria, may occur when the sensor data satisfies a threshold, or may occur at any other similar instance. Examples of the triggering event may include determining when an object, including the monitoring node, enters the object of interest, determining when the monitoring node reaches a geographic location, identifying a time of interest based on light and/or other attributes, or some other triggering event. In at least one implementation, an event triggering event may be based on sensor data from multiple sensors available on one or more physical nodes. In particular, rather than requiring sensor data from a single sensor to satisfy one or more criteria, one or more physical nodes may monitor sensor data from multiple sensors to determine whether a triggering event has occurred. For example, sensor data from a first sensor may be used to determine when seismic activity in the object of interest satisfies first criteria, while sensor data from a second sensor may be used to determine when vehicle movement in the object of interest satisfies a second criteria. When a monitoring node determines that both criteria are satisfied, a triggering event may be identified that can initiate one or more operations in other physical nodes of the system. In some examples, other nodes may be tasked to continue the operations, as the case when a new satellite appears available or within view of the object of interest. Furthermore, in some cases the triggering event may pre-empt existing operations for higher priorities, and the resultant activities that got pre-empted may be transitioned to another node.

As an example of a triggering event, a motion detector on physical node 130 may monitor for vehicles to come into object of interest 141. When a vehicle is identified in object of interest 141 based on the sensing data meeting triggering criteria, physical node 130 may notify one or more other action nodes in system 100 to provide the required application in support of the triggering event. As depicted in system 100, physical node 130 may identify the triggering event in object of interest 141 and communicate a notification to control system 170. Once communicated to control system 170, the notification may be distributed to other physical nodes, such as physical nodes 110-112 and 131-132, to provide an operation or activity to support the triggering event. In some examples, the operation may include configuring the action node to perform one or more tasks selected among imaging tasks (such as imaging of object of interest 141), communication relay tasks (communicating data about object of interest 141), and repositioning tasks for the action node to perform the imaging tasks or the communication relay tasks, or some other similar operation. In some examples, the operation may be used to collect and/or process additional sensor data associated with the object of interest, where the additional sensor data may comprise imaging data, light data, motion data, or some other similar data obtained from sensors on the nodes triggered by physical node 130.

In one implementation, when a second node is identified and obtains the notification from the first node, the second node may initiate execution of an application, wherein the application may operate as part of a virtual node, such as a virtual machine or container. Accordingly, when physical node 130 generates the notification and communicates the notification to physical node 111, physical node 111 may identify the notification and initiate execution of a container or virtual machine that can provide additional activities with respect to object of interest 141. These additional activities may include additional sensor monitoring of object of interest 141 and any object that might have triggered the sensor on physical node 130, may include processing sensor data from physical node 130 and physical node 111, or may include any other similar operation.

Although demonstrated as triggering an operation on physical node 111, the triggering event from node 130 may trigger operations on additional nodes to respond to the triggering event. As an example, multiple physical nodes in physical nodes 110-112 may be notified of the triggering event and may initiate an operation to respond to the event. These operations may be the same for all of the physical nodes or may be different based on the resources associated with the various physical nodes. For example, a first physical node 112 may monitor object of interest 141 using a first sensor that is available to first physical node 112, while a second physical node 111 may monitor object of interest 141 using a second sensor that is available to object of interest 141. In some examples, in triggering the operations on the various physical nodes, the nodes may be triggered at different time intervals. For example, physical node 112 may pass over object of interest 141 over a first time period, while physical node 111 may pass over object of interest 141 at a different time interval. As a result, the operations of physical node 112 may initially triggered by the event, but physical node 112 may handoff or transition the operations to physical node 111 to continue the monitoring of object of interest 141. This handoff may include providing state information about the data being observed, such as movement of objects, a most recent image, or some other similar information, and based on the state information, physical node 111 may execute a local operation that continues the observation of object of interest 141.

In some implementations, the operation that is initiated in response to the event may comprise a logical node (or software defined node) that executes over a plurality of physical nodes in system 100. This logical node, which is an example of a virtual node, may comprise processing resources, storage resources, communication resources, and sensor resources that may be spread across multiple nodes in system 100. As an example, although the processing resources (clock cycles, processing cores, and the like) and storage resources may be provided by physical node 111, a logical node may require sensor resources from physical node 112. To provide the platform for the logical node, each of the physical nodes may execute an application management platform that provides the resources to the various applications executing on the corresponding nodes. Thus, while the sensors for the application may be located on physical node 112, the application management platform may be used to transparently identify requests from the application executing on physical node 111, obtain the data from physical node 112, and provide the data to the application on physical node 111 as though the sensor were local to physical node 111. In at least one example, the applications executing on the physical nodes may employ an application programming interface (API) that permits the application to interact with physical hardware provided by the platform. As an example, when an application on physical node 111 requires an interaction with a sensor, the application management platform executed on physical node 111 may identify the request and determine the physical hardware allocated to the logical node. Once the physical hardware is identified, the application management service may locally access the data from the sensor on the physical node or may communicate a request to a second physical node to obtain the required sensor data. Advantageously, the application management platform permits an application to execute on a first physical node and transparently provide access to sensors that may be collocated on the same physical node or on a separate physical node. In this manner, applications may be developed without hardware considerations for the application on a single physical node.

Figure 2:
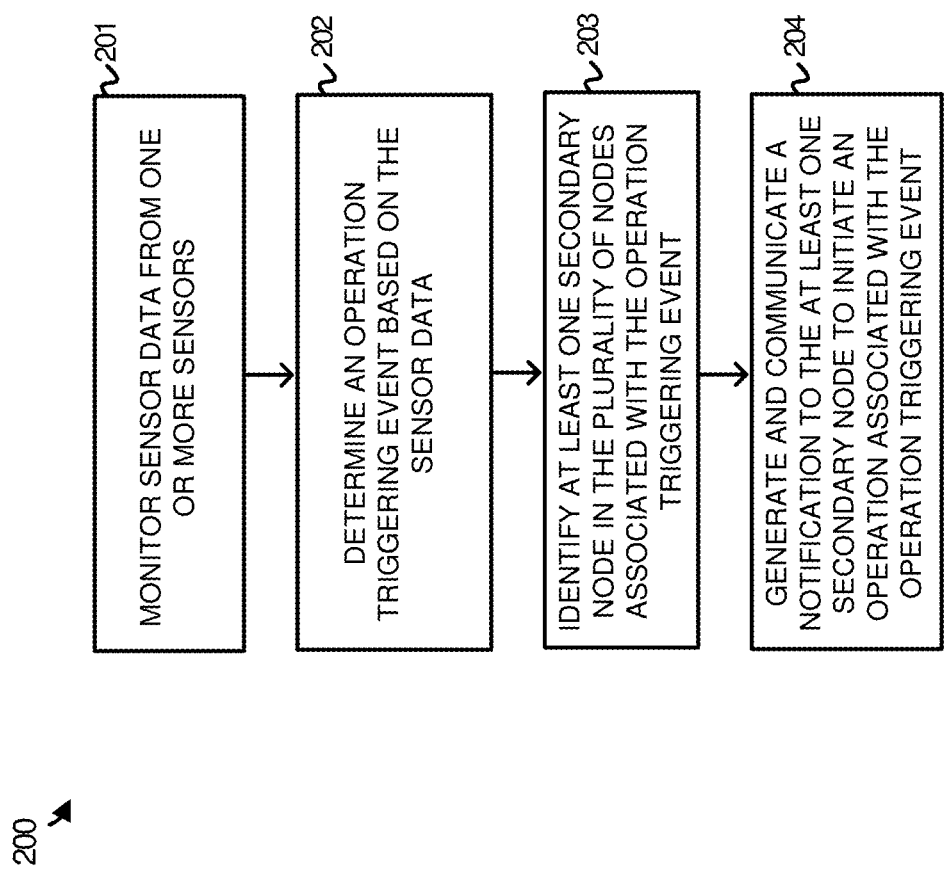
FIG. 2 illustrates an operation of a physical node to manage operation triggering events according to an implementation.

FIG. 2 illustrates an operation 200 of a physical node to manage operation triggering events according to an implementation. The processes of operation 200 are referenced parenthetically in the paragraphs that follow with reference to elements of system 100 of FIG. 1. Operation 200 is described as executing in physical node 130, however, other physical nodes in system 100 may provide similar monitoring operations.

As depicted operation 200 includes monitoring (201) sensor data from one or more sensors accessible to physical node 130. These sensors may include motion sensors, imaging sensors, heat and/or thermal sensors, proximity sensors, seismic sensors, meteorological sensors, chemical/radiation/nuclear/electronic/signal sensors, or some other similar sensor. While monitoring the sensor data, operation 200 further determines (202) an operation triggering event based on the sensor data. As an example, a sensor on physical node 130 may monitor motion of vehicles operating in geographic object of interest 141. When a vehicle is detected, an application operating on physical node 130 may determine that an operation triggering event has occurred. In some implementations, in monitoring the data, physical node 130 may monitor for a change in one or more properties related to an object of interest, where the changes may comprise changes between images, changes between light at a first instance and light at a second instance, seismic activity at a first instance and seismic activity at a second instance, orientation at a first instance and orientation at a second instance, or some other change in the sensor data, including the absence of anticipated change. In monitoring the changes, physical node may determine when the changes meet triggering criteria, such as when two images include enough changes to satisfy triggering criteria.

In response to the operation triggering event, physical node 130 may determine (203) at least one secondary physical node or action node in the system associated with the operation triggering event. In some examples, the at least one secondary node may comprise one or more airborne nodes or spaceborne satellite nodes capable of supporting the triggering event. In some implementations, the application on physical node 130 may be shared by multiple tenants, where tenants can use the application to trigger their individual operation. As an example, a first tenant may provide first criteria for when the first tenant's application should be triggered, while a second tenant may provide second criteria for when the second tenant's application should be triggered. Advantageously, the monitoring application may monitor the same data and compare the data to various criteria of the different tenants. In other implementations, the application may be unique to a tenant, and the tenant may define sensor data of interest and criteria to trigger an operation on at least one secondary physical node.

In some implementations, in determining which physical nodes should be identified to support the operation triggering event, physical node 130 may determine the current location of the physical nodes, the resources available on the physical nodes, or some other similar factors related to the ability of the physical nodes to support the operation triggering event. Once the information is obtained, physical node 130 may select one or more physical nodes to be used in supporting the required operation based on the factors. Thus, if physical node 111 included the required resources and were in the required geographic location to provide the operation associated with the operation triggering event, then physical node 130 may select physical node 111 to support the triggering event.

Once the at least one secondary physical node is identified, operation 200 further generates and communicates (204) a notification to the at least one secondary physical node to initiate an operation prompted by, and associated with, the operation triggering event. The notification may include an identifier for the operation that is to be initiated and may further include processed or unprocessed sensor data associated with the triggering event. In some implementations, the notification may trigger the execution of a virtual node capable of providing additional functions with respect to the object of interest. As an example, when physical node 130 determines that a triggering event has occurred, physical node 130 may generate a notification to be supplied to physical node 111, wherein physical node 111 may execute a virtual node to support the triggering event. In some instances, the virtual nodes triggered by the event may execute on a single physical node, wherein the virtual nodes may comprise a container or a virtual machine. In other instances, the virtual node or nodes may execute as a logical node (or software defined node) over a plurality of physical nodes, where an application management platform on the nodes may be responsible for identifying physical resources allocated to the logical node and provide the physical resources to an executing application in the logical node. As an example, physical node 111 may provide physical processing resources and storage resources for a logical node, while physical node 112 may provide the sensor resources capable of monitoring object of interest 141. In supporting the operation, the application management platform may transparently provide the application access to the sensor as though the sensor were local to physical node 111. In particular, the application management platform may identify requests to the sensor from the application (in some examples using an application programming interface (API)) and may request and obtain the data from the sensor on physical node 112.

In some examples, the virtual nodes initiated from the trigger event may be used to collect and/or process additional sensor data associated with the object of interest, where the additional sensor data may comprise imaging data, light data, motion data, radar data, or some other similar data obtained from sensors on the nodes triggered by physical node 130. As an example, if physical node 130 identified movement of a vehicle in object of interest 141, physical node 130 may initiate one or more virtual nodes on other physical nodes to collect and/or process additional sensor data related to object of interest 141. The applications of the virtual nodes may be used to obtain imaging data and provide supplemental analysis on the state of object of interest 141.

Although demonstrated in the example of operation 200 as determining the at least one secondary physical node at the first physical node, a notification may be generated that is provided to control system 170, where control system 170 may determine the at least one secondary physical node (or action node) to support the request. This determination of the at least one secondary physical node may be based on the current location of the physical nodes, such as the orbit or flight pattern of the physical nodes, may be based on which physical nodes include the required hardware and software to provide the operation, or may be based on any other similar factor. Once the at least one secondary physical node is identified, control system 170 may distribute the notification to the at least one secondary physical node. In some implementations in distributing the notification, the notification may include a request to initiate an operation and may further include data related to the operation. The data may include various processed and unprocessed sensor data including images, seismic activity information, motion information, or some other similar data.

While depicted in the example of system 100 as using a ground control system to communicate the notification to the second physical nodes, physical node 130 may communicate the notification directly to the at least one secondary physical node. For example, when the trigger event is identified by physical node 130, physical node 130 may communicate the data to another physical node, such as a drone, capable of providing and/or processing sensor data for object of interest 141. The notification may include the request to initiate an operation and may further include additional processed or unprocessed sensor data to assist in the newly initiated operation.

In some examples, the various physical nodes 110-112 and 130-132 or control system 170 may be used to determine new triggering events capable of triggering operations on other physical nodes. In particular, physical nodes 110-112 and 130-132 or control system 170 may monitor sensor data in relation to the initiation of one or more applications. If trends are determined, such that an application is initiated when certain sensor data attributes are identified, a new triggering event may be implemented or suggested for the application. Thus, rather than manually requiring an administrator or user to trigger the initiation of the application, sensor data from one or more physical nodes may be used to trigger the execution of the desired application. As an illustrative example, an administrator may initiate an application to use imaging sensors for a region of interest whenever motion is detected within the particular geographic region of interest. Control system 170 may identify the trend in data that corresponds to initiating the application and generate a new triggering event that monitors for the required motion. In some implementations, to identify the triggering event control system 170 may generate a lightweight application or widget capable of identifying and processing the motion data to determine when to generate the triggering event.

Figure 3:
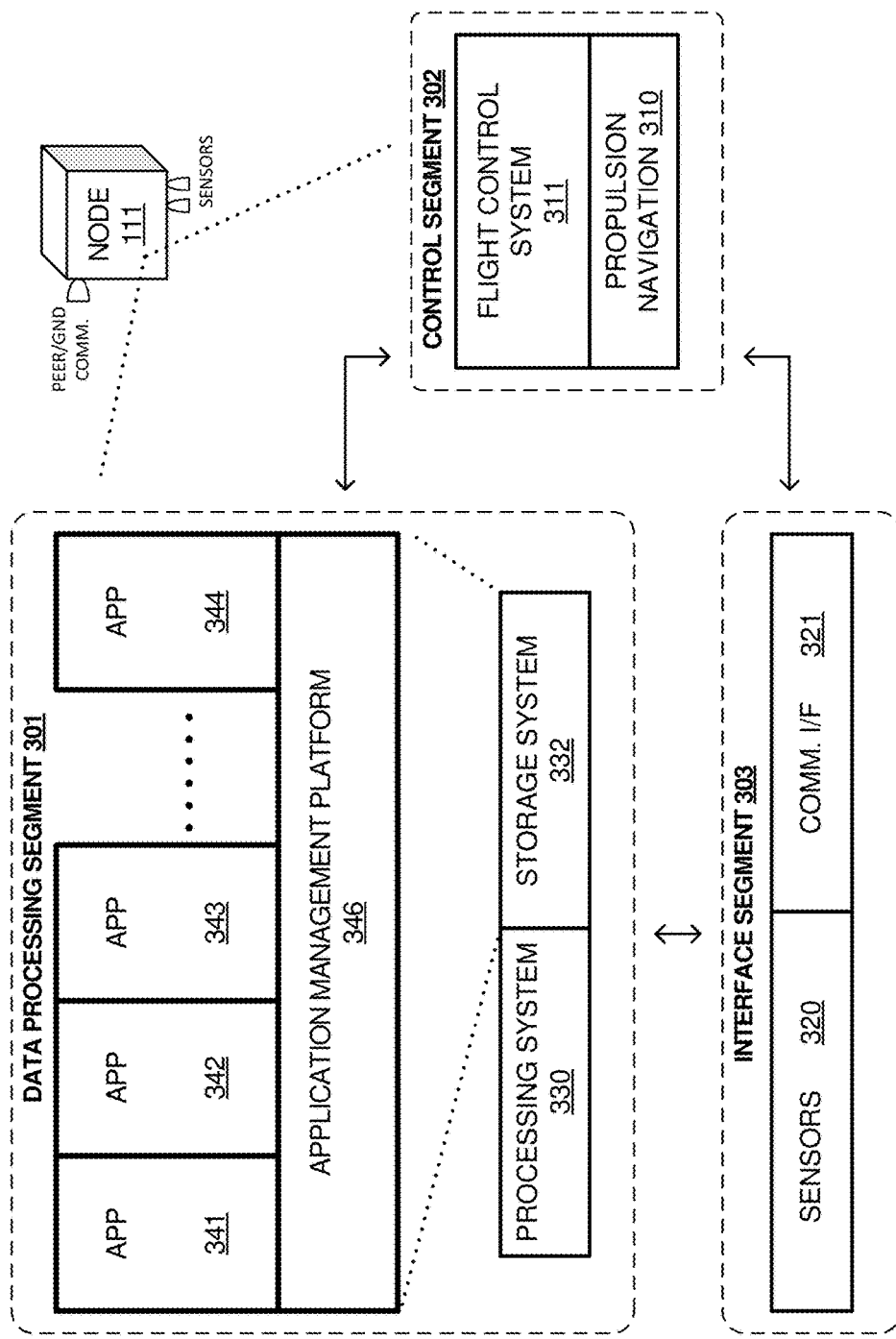
FIG. 3 illustrates an expanded view of a physical node according to an implementation.

FIG. 3 illustrates an expanded view 300 of physical node 111 of FIG. 1 according to an implementation. Physical node 111 can be an example of any of nodes 110-112 and 130-132 of FIG. 1, although variations are possible. Physical node 111 includes data processing segment 301, control segment 302, and interface segment 303. Data processing segment includes processing system 330 and storage system 332 that stores applications 341-344 that execute via management platform 346. Control segment includes flight control system 311 and propulsion navigation 310. Interface segment 303 includes sensors 320 and communication interface 321.

As described herein, physical nodes in an observation system may provide a platform for various tenants to deploy and execute applications that provide various operations. These operations may include military and civilian observation operations, communications operations, navigation operations, weather operations, and research operations. In at least one example, a tenant may deploy an application that requires a notification to initiate the desired operation. As an example, a first physical node may monitor sensor data about an object of interest and may determine when the sensor data meets criteria. Once the sensor data meets criteria, the first physical node may generate and communicate a notification to at least one secondary node, where the notification directs the at least one secondary node to initiate an operation based on the notification. This operation may include initiating execution of an application, which may operate as part of a virtual or logical node executing over one or more physical nodes in the platform.

As depicted in expanded view 300, data processing system 301 includes processing system 330 and storage system 332, where storage system 332 stores application management platform 346 (operating system, hypervisor, or the like), and applications 341-344. Applications 341-344 execute on top of application management platform 346 and may operate inside of one or more virtual nodes, where the virtual nodes may comprise containers, virtual machines, or some other similar virtualized element. In some implementations, a notification may be received at communication interface 321 in interface segment 303 that includes a request to initiate at least one application on node 111. In response to the request, which is identified by application management platform 346, at least one application in applications 341-344 may be initiated to provide a desired operation. In at least one implementation, the notification may identify an object of interest for the application to monitor using one or more sensors that may be collocated on physical node 111 or may be located on a separate physical node in some implementations.

In some examples, application management platform 346 may manage the allocation of resources to each of the applications. These resources may include storage resources, communication resources, sensor resources, or some other similar resources. As an example, if application 341 executed in a first container on physical node 111, application management platform 346 may provide any required sensors from sensors 320, storage from storage system 332, or any other similar resource to the container required for the operation of application 341. In some implementations, an application may execute as part of a logical node that includes resources over multiple physical nodes, where an application management platform on each of the physical nodes may provide the various resources to accommodate the response. As an example, application 341 may initiate a request for sensor data from a sensor located on another physical node. As a result, application management platform 346 may identify the request and forward the request to the corresponding physical node with the sensor, wherein the application management platform located on the remote physical node may obtain the required data and return the data for application 341. In some examples, the physical resources allocated to an application as part of a logical node may be transparent to the application. Instead, the applications may use arbitrary identifiers and APIs, and the application management platform may translate the requests to the appropriate hardware associated with the application. In some examples, this permits the sensor resources, communication resources, and storage resources to be dynamic, where a first set of resources may initially be allocated to a logical node but may change over time. This may permit a logical node to a use a first sensor capable of monitoring an object of interest during a first time period but may change the configuration of the logical node to include a second physical sensor capable of monitoring the object of interest during a second time period. Thus, while the application may remain executing on a first physical node, the sensors and other physical resources required by the application may dynamically change based on geographic location requirements or some other requirement associated with the logical node.

Although described in the previous examples as receiving a notification from another physical node, physical node 111 may further include applications capable of generating a notification to initiate operations on another physical node. In some implementations, an application may monitor data from sensors 320 and determine when the sensor data meets defined criteria, wherein the criteria may comprise motion of objects, temperature values, changes between images, or some other similar criteria. Once satisfying the criteria, the application may generate a notification for another physical node in system 100 to trigger an operation on the other physical node, wherein the operation may comprise the execution of an application as part of or outside of a virtual node.

In addition to the data processing operations provided in data processing segment 301, physical node 111 further includes control segment 302. Control segment 302, which may be communicatively linked to data processing segment 301 and interface segment 303, is responsible for logistical control elements of physical node 111. The operations may include managing the deployment of solar panels on a satellite, managing the positioning of a satellite with regards to the Earth or the sun, providing a spaceborne sensor pointing and control, autonomously managing target decks or tasking priorities, or any other similar operation. When physical node 111 comprises an aircraft or atmospheric node, then control elements can include flight control systems, power systems, navigation systems, sensor pointing and control, autonomously managing target decks or tasking priorities, among other elements. When physical node 111 comprises a surface node, then control elements can include propulsion elements, power systems, powertrains, navigation systems, and the like. A flight control system might not be employed in all node types, such as stationary surface nodes.

In at least one example, flight control system 311 may monitor for requests from data processing segment 301 and determine whether the node can accommodate the request. As an example, application 344 may require movement of a satellite, aircraft, or vehicle to provide an operation with respect to a sensor of sensors 320. Control segment 302 may determine whether the movement is permitted and implement the required action if permitted. The determination of whether an action is permitted by control segment 302 may be determined based on other applications executing on the node, based on flight requirements of the node, or based on some other similar mechanism.

Also depicted in expanded view 300 is interface segment 303 with sensors 320 and communication interface 321. Interface segment 303 may be communicatively coupled to data processing segment 301 and control segment 302. Sensors 320 may comprise imaging sensors, heat sensors, proximity sensors, light sensors, or some other similar type of sensor. Sensors 320 may be accessible to applications 341-344 executing in data processing segment 301 and may further be accessible to one or more other applications executing on other nodes of the system. In at least one implementation, each of the sensors may be allocated to one or more virtual nodes, where the virtual nodes may each access the sensor during defined time periods, may jointly obtain data derived from the sensor at the same time (e.g. all virtual nodes can access the same imaging data), or may be provided access to sensors at some other interval. In addition to sensors 320, interface segment 303 further includes communication interface 321 that may be used to communicate with other physical nodes and/or management systems for system 100. In some examples, communication interface 321 may work with application management platform 346 to control the application communications. Thus, if application 341 required a communication with another physical node to obtain sensor data from the physical node, communication interface 321 may forward the communication to the appropriate node and obtain the data from the node.

While demonstrated in the example of expanded view 300 using a satellite node, physical nodes may be represented in a variety of forms. These physical nodes may comprise airplanes, drones, balloons, land vehicles (cars, trucks, trains, and the like), water vehicles, or some other similar physical node. These physical nodes may include a data processing segment capable of providing a platform for the applications executing thereon, may comprise a communication interface to communicate with other physical nodes and/or control systems, and may further comprise one or more sensors capable of gathering required data for the applications executing thereon.

Figure 4:
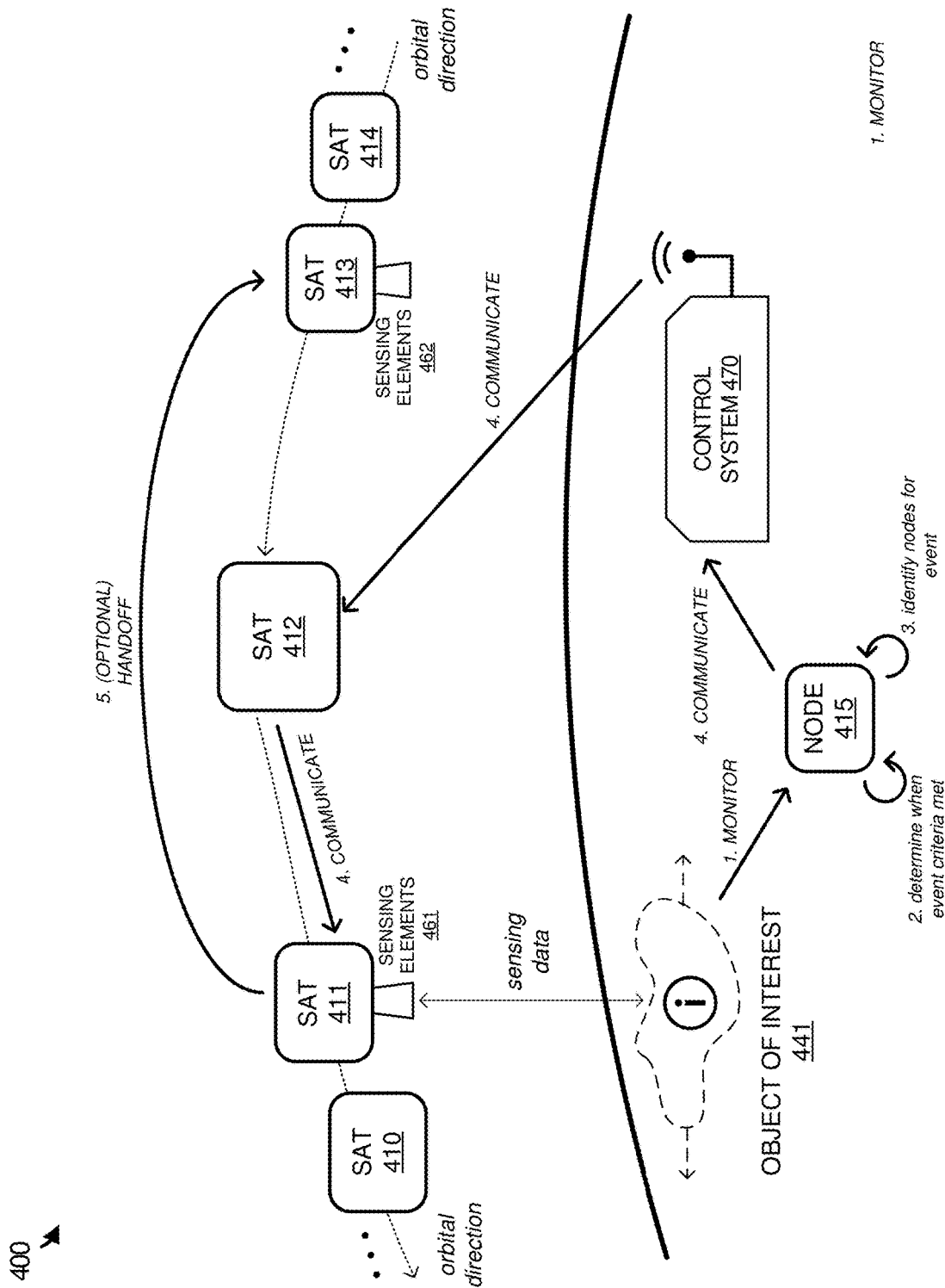
FIG. 4 illustrates an operational scenario of triggering an operation in a physical node according to an implementation.

FIG. 4 illustrates an operational scenario 400 of triggering an operation according to an implementation. Operational scenario 400 demonstrates a system with satellites 410-414, physical node 415, object of interest 441, and control system 470. Satellites 410-415 are representative of physical nodes that may be deployed as a platform to observe and provide various processing operations for tenants of the platform.

In operation, physical node 415, which may comprise a land-based vehicle, a water-based vehicle, a stationary observation node, a missile defense system, or some other similar physical node monitors, at step 1, object of interest 441 using one or more sensors on physical node 415. Object of interest 441 may comprise a geographic area of interest, a vehicle, or some other object of interest. The sensor data monitored by physical node 415 may include imaging data, motion data, heat or thermal data, light data, seismic activity data, or some other similar data. As the data is collected, physical node 415 may determine, at step 2, when the monitored data meets criteria. As an example, physical node 415 may monitor motion sensing data to determine when an object is located in object of interest 441. Other examples of criteria may include a quantity of seismic activity, an amount of change between a first image to a second image (used to determine motion of objects), or some other similar criteria.

After the criteria is satisfied or met, which is classified as an operation triggering event, physical node 415 may identify, at step 3, at least one secondary physical node in the platform associated with the operation triggering event. In identifying the at least one secondary physical node, physical node 415 may identify at least one secondary physical node with an application capable of providing additional observations and/or processing associated with object of interest 441, at least one physical node with sensors available to monitor object of interest 441, or some other method of identifying the at least one secondary node. In at least one implementation, the secondary node may comprise an airborne node or satellite node available to the system. As depicted in operational scenario 400, physical node 415 selects satellite 411 to provide the required observations, as satellite 411 includes sensing elements 461 capable of monitoring object of interest 441. Satellite 411 may further include the required application, data storage, communication resources, or other similar resources to support the operation triggering event.

Once the at least one secondary node is identified by physical node 415, a notification is communicated, at step 4, to satellite 411 using control system 470 and satellite 412, where the notification indicates a request to initiate an operation associated with the operation triggering event. In some examples, the notification may indicate an operation to be executed by the satellite, where the operation may comprise configuring the node to perform one or more imaging tasks related to object of interest 441, communication relay tasks related to communicating various data to support the event, and repositioning tasks for the node to perform the imaging tasks or the communication relay tasks. In some implementations, the notification may indicate a request to initiate an application on satellite 411, wherein the application may operate as part of a container, virtual machine, or some other virtual node. As demonstrated in the example of operational scenario 400, when a secondary physical node is selected in the platform, the notification may be propagated over one or more other physical nodes in the platform to arrive at the required destination node.

After the notification is received at the selected satellite 411, satellite 411 may initiate the required operation to support the operation triggering event. In some implementations, the operation may include initiating a virtual node, where the virtual node includes at least one application that is allocated physical processing and storage resources, sensor resources, communication resources, or some other similar resource. In some examples, the data for the virtual node may be stored locally on satellite 411, permitting satellite 411 to initiate the locally stored application in response to receiving the notification. In other examples, the data for the virtual node may be stored on one or more other satellites, requiring satellite 411 to obtain the required data from the one or more other satellites prior to execution. In still other examples, the virtual node may comprise a software defined node (or logical node) that uses resources across multiple satellites or physical nodes in the platform, where processing resources, storage resources, and sensor resources may be distributed across the physical nodes of the platform.

In some implementations, although a first physical node may provide the required operation for object of interest 441, the motion of the physical node may require satellite 411 to handoff, at step 5, the operations for the vent to a second physical node (satellite 413). This handoff may include communicating state data for the application, including sensor data, location data, pointing and control data, atmospheric data, any processed sensor data, or any other similar state information. Once the state data is communicated to satellite 413 and satellite 413 initiates an application to support the event, satellite 413 may continue the operations for object of interest 441. Thus, although a first satellite may be selected by physical node 415, the first satellite may migrate the operations to other virtual machines as required based on the orbit of the satellites.

Although demonstrated in the example of operational scenario 400 as initiating an operation in a satellite, similar operations may be used to spawn operations in other types of physical nodes such as drones, airplanes, or balloons, land and water vehicles, missile, rocket, stationary surface or sub-surface nodes, or some other devices. Further, while demonstrated in the example of operation scenario 400 as monitoring sensor data on a single monitoring node, a triggering event may be initiated based on sensor data on multiple sensors distributed over one or more physical nodes. In some implementations, multiple monitoring nodes may gather sensor data from associated sensors and determine whether the sensor data meets one or more criteria. Once the one or more criteria are satisfied, a monitoring node may generate a notification to initiate a new operation. As an example, a first physical node may obtain first sensor data for object of interest 441 and provide the first sensor data to a second physical node that obtains second sensor data for object of interest 441. When the first sensor data and the second sensor data satisfy criteria, the second physical node may generate a notification for another physical node to initiate supplemental operations with regards to object of interest 441. In another embodiment, multiple notifications may be used to trigger the subsequent operation on the action node. As an example, a first node may monitor first sensor data for object of interest 441 and when the first sensor data satisfies one or more criteria may generate a notification to initiate an operation. Additionally, a second node may monitor second sensor data for object of interest 441 and when the second sensor data satisfied one or more criteria, the second node may generate a notification to initiate the operation. Once the notification is received from both monitoring nodes, the action node may initiate the required operation. Advantageously, this permits operations and application to require multiple triggering events prior to initiating the operation.

Figure 5:
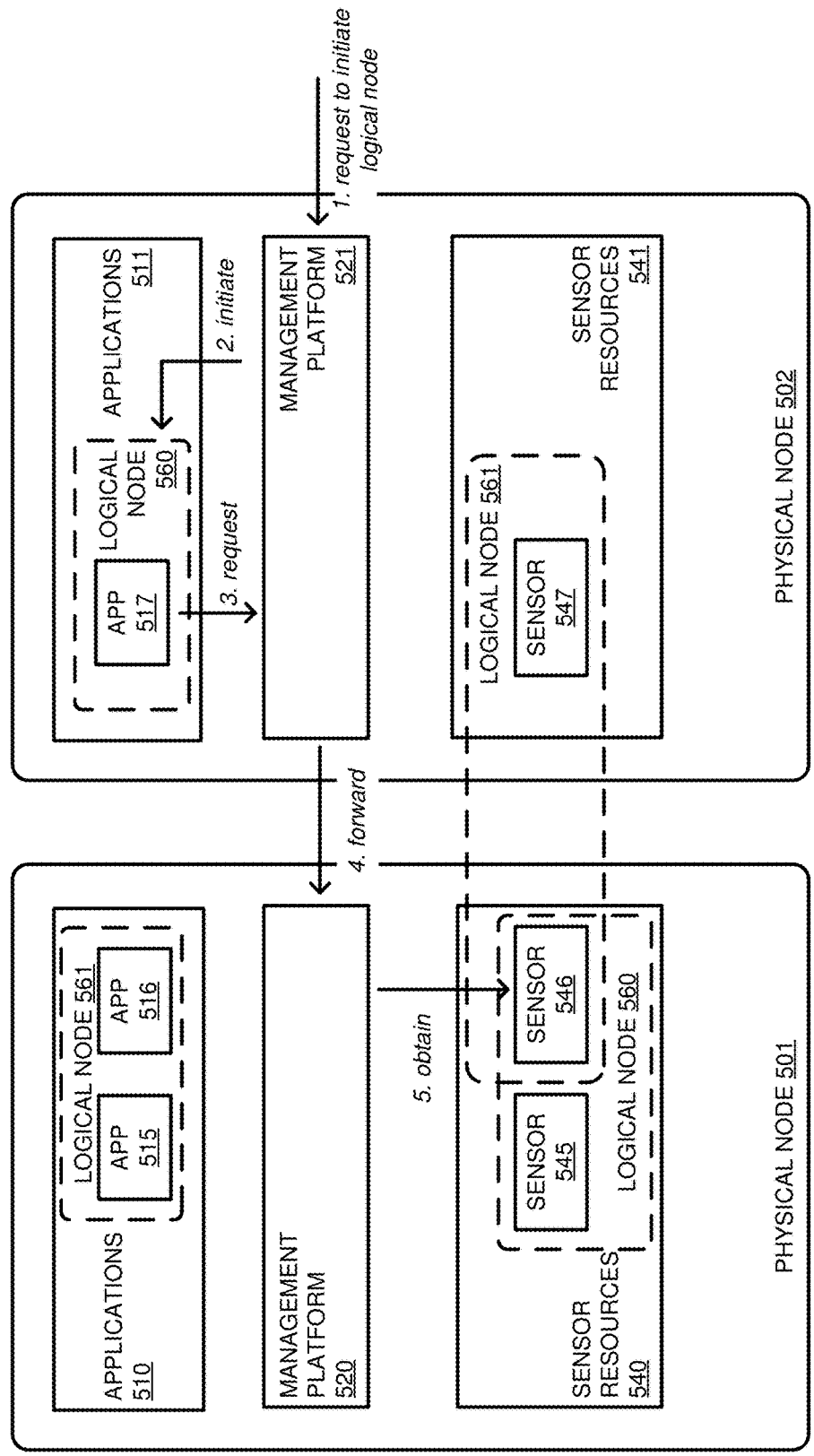
FIG. 5 illustrates an operation to initiate a logical node according to an implementation.

FIG. 5 illustrates an operation 500 to initiate a logical node according to an implementation. Operation 500 includes physical nodes 501-502 that each include corresponding applications 510-511, management platforms 520-521, and sensor resources 540-541. Applications 510 includes applications 515-516 that operate as part of logical node 561, and applications 511 includes application 517 that operates as part of logical node 560. Sensor resources 540 includes sensors 545-546 and sensor resources 541 includes sensor 547. Sensors 545-546 correspond to logical node 560, while sensors 546-547 correspond to logical node 561.

As described herein physical nodes in a system may be configured with logical nodes that can execute across one or more of the physical nodes. In providing the platform for the execution of the logical nodes, each physical node of physical nodes 501-502 includes a management platform 520-521 that manages the execution of the applications and the interaction with the various physical resources. These physical resources may include storage resources, processing resources, sensor and communication resources, or some other resource. Although logical nodes 560-561 execute using resources from multiple physical nodes, management platform 520-521 may be used to provide access to the various resources as though the resources were local to the same physical node.

In initiating a logical node on physical nodes 501-502, each of the physical nodes may be configured to obtain a notification that indicates a request to initiate a logical node operation. In some implementations, the logical node may comprise a container or virtual machine that uses resources on a single physical node, however, the logical node may also comprise an application that uses physical resources that are available over multiple physical nodes. As depicted in operation 500, a notification is received at management platform 521 of physical node 502 with a request to initiate a logical node, at step 1. In response to the request, management platform 521 may identify the corresponding logical node, and initiate, at step 2, logical node 560 to support the request. In some examples, logical node 560 may be locally stored on physical node 560, permitting the application to execute in response to the request. In some examples, the request may require management platform 521 to obtain the data for the logical node form another physical node and once received, may initiate the execution of the logical node. Once initiated, the logical node may provide various operations associated with an object of interest.

In some examples, the notification obtained to initiate the logical node may include information about the object of interest. This information may include where the object of interest is located, whether moving or still, object state vector information, what triggered the notification, the identifier for the logical node or application to be initiated, or some other similar information related to the initiation of the logical node. The logical node may use the information to provide the required operations.

Once application 517 is initiated as part of logical node 560, application 517 may initiate, at step 1, a request of sensor 546. In response to the request, management platform 521 may determine a location of the required sensor and forward, at step 2, the request to management platform 520 to obtain the required data. Once received at management platform 520, management platform 520 may obtain, at step 3, the data associated with the request from sensor 546 and return the data to management platform 521 and application 517. In generating applications 515-517, the applications may be written with an API that permits that applications to address the various hardware resources required for the applications. Referring to the example read from sensor 546, application 517 may use an associated identifier for sensor 546 along with an API command to read data from the sensor. In response to the execution of the command, management platform 521 may identify the physical sensor that is associated with the request and forward the request to the appropriate sensor. To forward the request to the appropriate sensors, the application management platform may include lookup tables or other data structures that can identify requests for resources and determine the appropriate locations or addresses of the resources.

As demonstrated in the example of operation 500, sensors (and other physical resources) may be shared by multiple logical nodes. In managing the allocation of physical resources to each of the logical nodes, the application management platform may provide time shares (e.g. a first period of time to logical node 560 and a second period of time to logical node 561) or may provide the same data to each of the logical nodes. In the first example, the management platform may permit logical node 560 to access sensor 546 during a first portion of the orbit and may permit logical node 561 during a second portion of the orbit. In some implementations, each of the applications may be configured to only request data from the sensor during their corresponding time period. However, the management platform may also maintain permissions information for the various logical nodes and provide access to hardware based on the permissions. Thus, while a logical node may be provided with a first configuration that permits access to a sensor, a second configuration may not permit access to the same sensor. Advantageously, the physical configuration of the logical node may be dynamic based on the requirements of the logical node or other logical nodes. In a second example, rather than time sharing a physical resource, logical nodes may use the sensor over the same time period. In these examples, each of the logical nodes may be provided with the same raw data from the sensor, often without a request, and may be processed locally by each of the applications to provide the desired operation.

Figure 6:
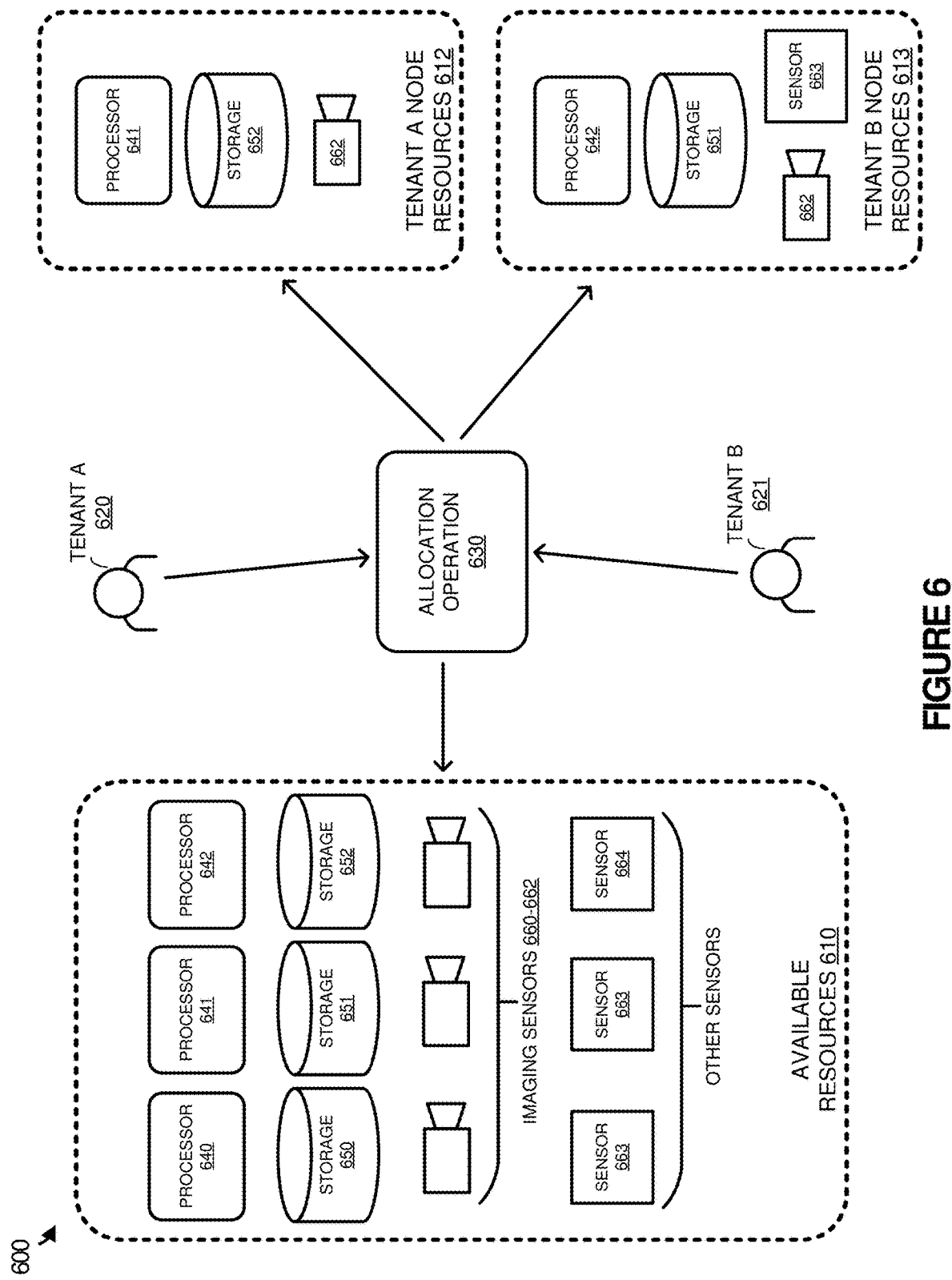
FIG. 6 illustrates an operation of allocating available resources to logical nodes according to an implementation.

FIG. 6 illustrates an operation 600 of allocating available resources to logical nodes according to an implementation. Operation 600 includes available resources 610, allocation operation 630, tenants 620-621, and tenant node resources 612-613. Available resource 610 includes processors 640-642, storage 650-652, and sensors 660-664, where items from available resources 610 may be allocated to tenant node resources 612-613 to operate as part of a logical node.

As described herein, tenants 620-621 may generate applications to be deployed on one or more physical nodes of a system that provides sensor monitoring and processing, wherein the applications may be allocated various resources from available resources 610. In allocating the physical resources, each tenant of tenants 620-621 may specify resource requirements for their corresponding application. These physical resource requirements may include processing requirements, storage requirements, sensor requirements, communication requirements, or some other similar type of requirement. In response to the request, allocation operation 630, which may execute as part of a control system for the converged system, may identify resources from available resources 610. In some implementations, tenants 620-621 may specify a minimum quality of service for each of the resources required for the corresponding application. From the minimum quality of service, allocation operation 630 may select resources from available resources 610 to provide the required operations of the application. In other implementations, the tenants may individually select each of the resources for the application, such as a processor of processors 640-642, storage from storage 650-652 (which may be located on the same or different physical nodes), and sensors from sensors 660-664.

Once the resources are selected, allocation operation 630 may generate a logical node to support the operations of the application. Referring to tenant A node resources 612, tenant 620 is allocated processor 641, storage 652, and imaging sensor 662. Meanwhile, tenant B node resources include processor 642, storage 651, imaging sensor 662, and sensor 663. While demonstrated as providing each tenant their own processor, tenants may share a processor by time division processing, allocation of cores of the processing system, or some other sharing mechanism of a processor. As depicted in operation 600, multiple logical nodes may be allocated the same sensor (sensor 662). To support the access to the sensor, allocation operation 630 may provide time separated access, may permit multiple applications to obtain data from a buffer associated with the sensor simultaneously, or may provide access in any other manner. As an example, when the logical node for tenant A 620 requests data from sensor 662, data may be pulled from a buffer for sensor 662 that caches data for the sensor. Additionally, when the logical node for tenant B 621 requires data for its application, data may be pulled from the same buffer without interfering with the operations of the other node.

In some implementations, each of the logical nodes associated with the tenants may be executed in response to a triggering event identified on other physical nodes in the converged system. These other physical nodes may execute a monitoring application that identifies sensor data related to an object of interest and determines when the sensor data meets defined criteria. Once the sensor data satisfies the criteria, the other physical node may communicate a notification to at least one physical node associated with the logical node. Using the example of tenant A 620, the other physical node may communicate a notification to the physical node with processor 641 to trigger the execution of the application or applications associated with the logical node for tenant A 620.

In some examples, the available resources allocated to each of the logical nodes may be dynamic and may be changed based on failure of a physical node, based on the addition or subtraction of a logical node in the system, based on the geographic region available for monitoring by the various sensors, based on a selected object of interest, or some other similar modification event. Consequently, the application management service that executes as part of the physical nodes may identify the transition to another physical node and modify data input/output requests such that they are directed to the new physical resource.

Figure 7:
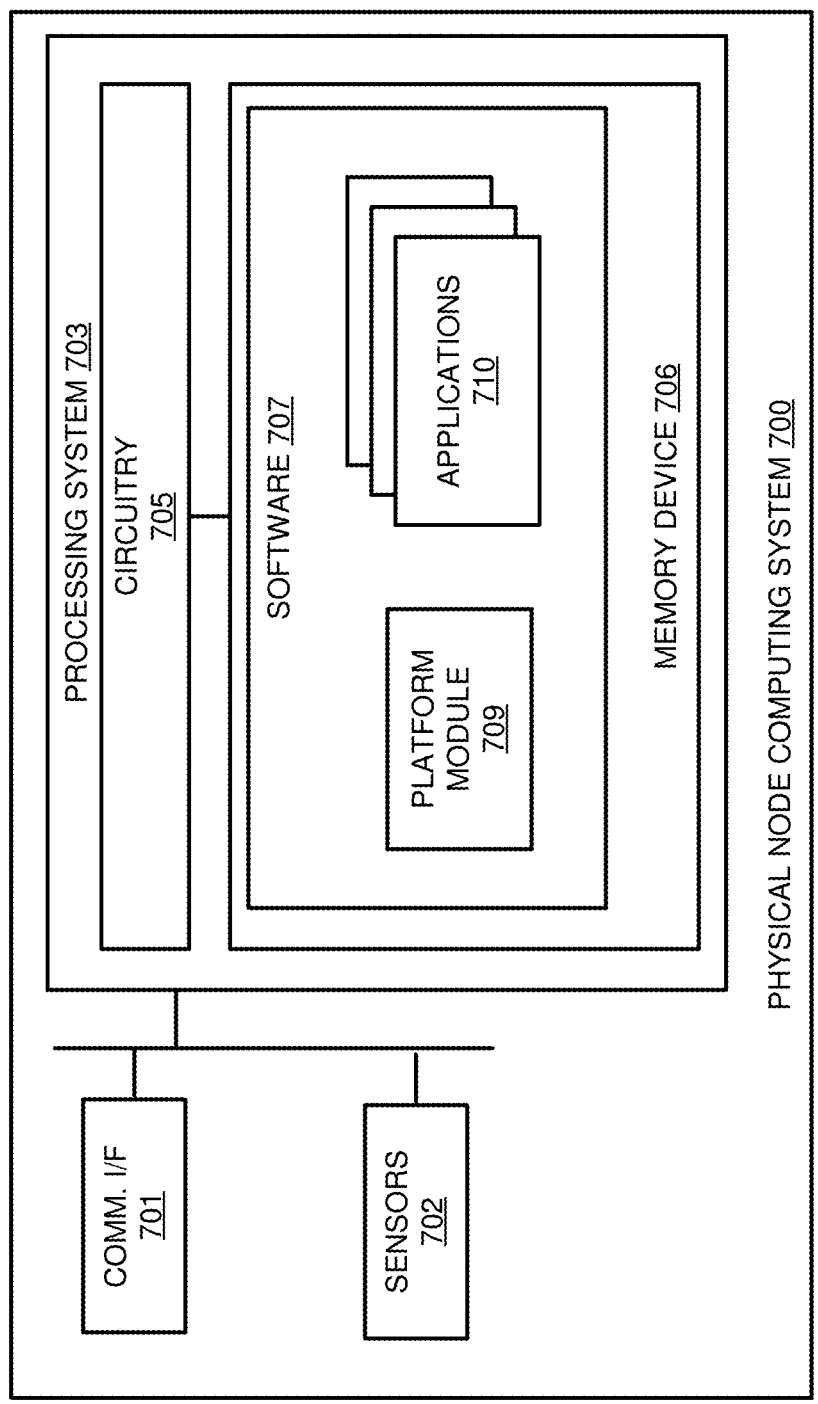
FIG. 7 illustrates a physical node computing system according to an implementation.

FIG. 7 illustrates a node computing system 700 according to an implementation. Computing system 700 is representative of any computing system or systems with which the various operational architectures, processes, scenarios, and sequences disclosed herein for a physical node may be implemented. Computing system 700 is an example of physical nodes 110-112 and 130-132 in FIG. 1, although other examples can be employed. Computing system 700 comprises communication interface 701, sensors 702, and processing system 703. Processing system 703 is linked to communication interface 701 and sensors 702. Sensors 702 may comprise imaging sensors, heat sensors, proximity sensors, acoustic sensors, vibration sensors, light sensors, or some other similar type of sensor. Processing system 703 includes processing circuitry 705 and memory device 706 that stores operating software 707. Computing system 700 may include other components such as a power system, photovoltaic solar panels, battery, and enclosure that are not shown for clarity.

Communication interface 701 comprises components that communicate over communication links, such as network cards, ports, radio frequency (RF), processing circuitry and software, or some other communication devices. Communication interface 701 may be configured to communicate over conductive, wireless, or optical links. Communication interface 701 may be configured to use Time Division Multiplex (TDM), Code Division Multiplex (CDM), Internet Protocol (IP), Ethernet, optical networking, wireless protocols, communication signaling, or some other communication format, including combinations thereof. In at least one implementation, communication interface 701 may be used to communicate with a control system and one or more other physical nodes in a converged system, where the physical nodes may comprise mobile or stationary devices, such as satellites, drones, airplanes, or balloons, land and water vehicles, stationary surface or sub-surface nodes, or some other devices.

Processing circuitry 705 comprises microprocessor and other circuitry that retrieves and executes operating software 707 from memory device 706. Memory device 706 may include volatile and nonvolatile, removable and non-removable media implemented in any method or technology for storage of information, such as computer readable instructions, data structures, program modules, or other data. Memory device 706 may be implemented as a single storage device, but may also be implemented across multiple storage devices or sub-systems. Memory device 706 may comprise additional elements, such as a controller to read operating software 707. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory.

Processing circuitry 705 is typically mounted on a circuit board that may also hold memory device 706 and portions of communication interface 701 and user interface 702. Operating software 707 comprises computer programs, firmware, or some other form of machine-readable program instructions. Operating software 707 includes platform module 709 and applications 710, although any number of software modules may provide a similar operation. Operating software 707 may further include an operating system, utilities, drivers, network interfaces, applications, or some other type of software. When executed by processing circuitry 705, operating software 707 directs processing system 703 to operate computing system 700 as described herein.

In one implementation, platform module 709 directs processing system 703 to maintain a platform for applications 710, where applications 710 operate as part of virtual nodes that may comprise virtual machine, containers, or logical nodes that operate over one or more physical nodes. In particular, communication interface 701 may receive configuration data from other physical nodes or a control system to provide the operations of the virtual nodes. Once the configuration data is provided, applications 710 may execute via processing system 703 to provide the required operations of the various virtual nodes. In some examples, the configuration data for a virtual node may include the application, as well as physical resource information for the virtual node, where the physical resource information may define processing resources, storage resources, sensor resources, and communication resources, among other resource types.

In at least one implementation, to trigger operations of applications 710 in physical node computing system 700, communication interface 701 may be used to communicate with one or more other physical nodes that provide monitoring operations and notify computing system 700 when the monitoring operations meet defined criteria. When a notification is received, in some examples at platform module 709, an operation may be executed in response to the notification. In some examples, the notification may trigger a particular operation in an application. In other examples, the notification may spawn or initiate the virtual node associated with an application. For example, a notification may be received that indicates vehicle movement in a particular geographic location. In response to the notification, an application in applications 710 may be initiated as a virtual node that operates on platform module 709, wherein platform module 709 may provide any required sensors, storage, or communication resources to the application operating as the virtual node. In some examples, when the virtual node comprises a container or virtual machine, the resources may be local to computing system 700. In other examples, when the virtual node comprises a logical node, the resources may be distributed over one or more physical nodes, where platform module 709 may be responsible for transparently providing the required physical resources to the application as though the resources were local to computing system 700.

Although demonstrated in the previous example as initiating application 710 when a notification is received at computing system 700, computing system 700 may also be used to trigger operations, such as applications and virtual nodes, on other physical nodes. As an example, an application in applications 710 may monitor seismic activity of a geographic location. When the seismic activity meets criteria, the application may generate a notification and communicate the notification to one or more other physical nodes to initiate an operation on the physical nodes, wherein the operation may comprise initiating an application as part of or outside of a virtual node. In some examples, in selecting the one or more other physical nodes, the application may consider the location of other physical nodes in the system, may consider the types of sensors on other physical nodes of the system, may consider processing or storage resource required for the application, or may consider any other factor in selecting the one or more other nodes to initiate the required operation.

In some implementations, the application that monitors the sensor data to trigger the operations on other physical nodes may comprise an application generated by the tenant with the application on the other physical nodes. In other implementations, the monitoring application may comprise an application implemented by the platform that permits various tenants to use the application in initiating the tenant specific application. These tenants may initiate their corresponding application using the same criteria or may specify their own criteria for initiating their applications.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method comprising:
   in a monitor node, monitoring sensor data related to an object of interest external to the monitor node from one or more sensors comprising the monitor node;
   detecting a triggering event based at least on the sensor data from the one or more sensors comprising the monitor node;
   identifying at least a selected action node from among one or more airborne nodes or spaceborne nodes based on a location indicated for the object of interest and available sensors associated with the selected action node;
   establishing a logical node arrangement comprising combined sensor resources from both the monitor node and the selected action node, and allocating the combined sensor resources of the logical node arrangement to the monitor node;
   responsive to the triggering event, communicating a notification to the selected action node to initiate in the selected action node:
     a virtual node comprising an application configured to execute an operation prompted by the triggering event; and
     allocation of sensor resources to the virtual node in support of the operation;
   wherein the operation comprises collecting additional sensor data to monitor the object of interest using the sensor resources allocated to the virtual node in the selected action node, and transferring the additional sensor data for delivery to the monitor node in accordance with the logical node arrangement.

2. The method of claim 1, wherein the one or more sensors of the monitor node comprise one or more among imaging sensors, heat sensors, seismic sensors, proximity sensors, and motion sensors.

3. The method of claim 1, wherein detecting the triggering event based on the sensor data comprises determining when at least a portion of the sensor data satisfies one or more triggering criteria.

4. The method of claim 1, wherein the monitor node comprises at least one among airborne nodes, surface nodes, and sub-surface nodes.

5. The method of claim 1, wherein the operation comprises configuring the selected action node to perform one or more tasks selected among imaging tasks, communication relay tasks, and repositioning tasks that positions the selected action node to perform the imaging tasks or the communication relay tasks.

6. The method of claim 1,
   wherein monitoring the sensor data from the one or more sensors comprising the monitor node comprises monitoring for a change in one or more properties related to the object of interest; and
   wherein identifying the selected action node associated comprises identifying the selected action node associated as having at least one sensor to monitor the object of interest.

7. The method of claim 1 further comprising:
   allocating the combined sensor resources of the logical node arrangement to an application executed by the monitor node.

8. The method of claim 1 further comprising:
   allowing new triggering events to be defined by individual airborne nodes or spaceborne nodes based at least on one or more past triggering events and associated sensor data.

9. A computing apparatus comprising:
   one or more non-transitory computer readable storage media;
   a processing system operatively coupled to the one or more non-transitory computer readable storage media; and
   processing instructions stored on the one or more non-transitory computer readable storage media that, when executed by the processing system, direct the processing system to:
     in a monitor node, monitor sensor data related to an object of interest external to the monitor node from one or more sensors comprising the monitor node;
     detect a triggering event based at least on the sensor data;
     identify at least a selected action node from among one or more airborne nodes or spaceborne nodes based on a location indicated for the object of interest and available sensors associated with the selected action node;
     establish a logical node arrangement comprising combined sensor resources from both the monitor node and the selected action node, and allocate the combined sensor resources of the logical node arrangement to an application executed by the monitor node; and
     responsive to the triggering event, communicate a notification to the selected action node to initiate in the selected action node:
       a virtual node comprising an application configured to execute an operation prompted by the triggering event; and
       allocation of sensor resources to the virtual node in support of the operation;
   wherein the virtual node collects additional sensor data to monitor the object of interest using the sensor resources allocated to the virtual node in the selected action node, and transfers the additional sensor data for delivery to the monitor node in accordance with the logical node arrangement.

10. The computing apparatus of claim 9, wherein the one or more sensors of the monitor node comprise one or more among imaging sensors, heat sensors, seismic sensors, proximity sensors, and motion sensors.

11. The computing apparatus of claim 9, wherein detecting the triggering event based on the sensor data comprises determining when at least a portion of the sensor data satisfies one or more triggering criteria.

12. The computing apparatus of claim 9, wherein the monitor node comprises at least one among airborne nodes, surface nodes, and sub-surface nodes.

13. The computing apparatus of claim 9, wherein the operation comprises configuring the selected action node to perform one or more tasks selected among imaging tasks, communication relay tasks, and repositioning tasks that positions the selected action node to perform the imaging tasks or the communication relay tasks.

14. The computing apparatus of claim 9,
wherein monitoring the sensor data from the one or more sensors comprising the monitor node comprises monitoring for a change in one or more properties related to the object of interest; and
wherein identifying the selected action node associated comprises identifying the selected action node associated as having at least one sensor to monitor the object of interest.

15. The computing apparatus of claim 9,
wherein monitoring the sensor data from the one or more sensors comprising the monitor node comprises monitoring for changes over time in the sensor data related to one or more properties of the object of interest.

16. The computing apparatus of claim 9, comprising further processing instructions that, when executed by the processing system, direct the processing system to:
allocate the combined sensor resources of the logical node arrangement to an application executed by the monitor node.

17. A system comprising:
a first physical node among a plurality of physical nodes comprising one or more airborne nodes or spaceborne nodes configured to:
monitor sensor data related to an object of interest external to the first physical node from one or more sensors comprising the first physical node;
detect a triggering event based at least on the sensor data;
identify a second physical node from among the plurality of physical nodes based on a location indicated for the object of interest and available sensors associated with the second physical node;
establish a logical node arrangement comprising combined sensor resources from both the first physical node and the second physical node, allocate the combined sensor resources of the logical node arrangement to an application executed by the first physical node; and
responsive to the triggering event, communicate a notification to the second physical node to initiate in the second physical node:
a virtual node comprising an application configured to execute an operation prompted by the triggering event; and
allocation of sensor resources to the virtual node in support of the operation;
wherein the virtual node collects additional sensor data to monitor the object of interest using the sensor resources allocated to the virtual node in the second physical node, and transfers the additional sensor data for delivery to the first physical node in accordance with the logical node arrangement.

18. The system of claim 17, wherein the one or more sensors of the first physical node comprise one or more among imaging sensors, heat sensors, seismic sensors, proximity sensors, and motion sensors.

19. The system of claim 17, wherein detecting the triggering event based on the sensor data comprises determining when at least a portion of the sensor data satisfies one or more triggering criteria.

20. The system of claim 17,
responsive to the triggering event, the first physical node configured to:
allocate the combined sensor resources of the logical node arrangement to an application executed by the first physical node.

* * * * *